(12) United States Patent
Tada et al.

(10) Patent No.: US 7,901,482 B2
(45) Date of Patent: Mar. 8, 2011

(54) REMOVAL METHOD OF NITROGEN IN MOLTEN STEEL

(75) Inventors: Chikashi Tada, Tokyo (JP); Chitoshi Matsumura, Kawasaki (JP)

(73) Assignee: JFE Steel Corporation, Tokyo (JP)

( * ) Notice: Subject to any disclaimer, the term of this patent is extended or adjusted under 35 U.S.C. 154(b) by 133 days.

(21) Appl. No.: 12/223,635

(22) PCT Filed: Feb. 6, 2007

(86) PCT No.: PCT/JP2007/052441
§ 371 (c)(1),
(2), (4) Date: Aug. 6, 2008

(87) PCT Pub. No.: WO2007/091700
PCT Pub. Date: Aug. 16, 2007

(65) Prior Publication Data
US 2009/0019968 A1    Jan. 22, 2009

(30) Foreign Application Priority Data

Feb. 9, 2006 (JP) .................................. 2006-032846

(51) Int. Cl.
*C21C 1/04* (2006.01)
*C21C 5/34* (2006.01)
*C21C 7/076* (2006.01)
(52) U.S. Cl. ................ 75/531; 75/512; 75/548; 75/568; 75/570
(58) Field of Classification Search .................. 75/548, 75/568, 570, 531, 545, 543
See application file for complete search history.

(56) References Cited

U.S. PATENT DOCUMENTS

| 4,154,602 | A | * | 5/1979 | Kaito et al. ..................... 75/512 |
| 4,222,768 | A | * | 9/1980 | Suyama ...................... 75/10.52 |
| 5,207,844 | A |   | 5/1993 | Watanabe et al. |
| 5,304,231 | A |   | 4/1994 | Kato et al. |
| 5,391,241 | A | * | 2/1995 | Watanabe et al. ............. 148/336 |
| 6,174,347 | B1 | * | 1/2001 | Barker ........................... 75/560 |

FOREIGN PATENT DOCUMENTS

| DE | 196 50 498 A1 | 4/1998 |
| JP | 02-179812 A | 7/1990 |
| JP | 03-153814 A | 7/1991 |
| JP | 03-158410 A | 7/1991 |

(Continued)

OTHER PUBLICATIONS

"Stainless Steel Grade 321" from AZo Materials. http://www.azom.com/details.asp?articleID=967, downloaded Apr. 14, 2010. Date added Oct. 23, 2001.*

(Continued)

*Primary Examiner* — George Wyszomierski
*Assistant Examiner* — Tima M McGuthry-Banks
(74) *Attorney, Agent, or Firm* — Holtz, Holtz, Goodman & Chick, PC

(57) ABSTRACT

Molten steel is refined in an electric furnace by using iron scrap as a main iron source, and is tapped into a separate refining vessel. Thereafter, metallic-Al containing material and CaO are added onto a bath surface of the molten steel, and an oxygen containing gas is supplied to the molten steel. Thereby, a nitrogen-removal reaction utilizing an AlN formation reaction is caused to proceed. Consequently, even in the case of molten steel having a low carbon content, a low-nitrogen steel can be refined and produced at low costs.

40 Claims, 4 Drawing Sheets

FOREIGN PATENT DOCUMENTS

| | | | |
|---|---|---|---|
| JP | 04-218644 A | | 8/1992 |
| JP | 05-287358 A | | 11/1993 |
| JP | 05-320733 A | | 12/1993 |
| JP | 05320733 A | * | 12/1993 |
| JP | 07-113113 A | | 5/1995 |
| JP | 07-224317 A | | 8/1995 |
| JP | 8-225819 A | | 9/1996 |
| JP | 08-246024 A | | 9/1996 |
| JP | 09-025509 A | | 1/1997 |
| JP | 09-165615 A | | 6/1997 |
| JP | 09165615 A | * | 6/1997 |
| JP | 09-235650 A | | 9/1997 |
| JP | 2000-192192 A | | 7/2000 |
| JP | 2002-294325 A | | 10/2002 |
| JP | 2003-089816 A | | 3/2003 |
| JP | 2004-346367 A | | 12/2004 |
| JP | 2005-023333 A | | 1/2005 |
| JP | 2005-232536 A | | 9/2005 |

OTHER PUBLICATIONS

Machine translation of JP 05-320733A published Dec. 1993.*
Machine translation of JP 09-165615 published Jun. 1997.*
Supplementary European Search Report (in English) dated Jul. 21, 2010 in EP 07 71 4049.
Korean Office Action dated Aug. 18, 2010 which issued in the counterpart Korean patent application.

* cited by examiner

REMOVAL METHOD OF NITROGEN IN MOLTEN STEEL

This application is the United States national phase application of International Application PCT/JP2007/052441 filed Feb. 6, 2007.

TECHNICAL FIELD

The present invention relates to a removal method of nitrogen in molten steel. More particularly, the invention relates to a technique of producing low nitrogen steel at low cost by performing melting and refining processing with existing facility while accomplishing reduction in the amount of $CO_2$ emission into the atmosphere.

BACKGROUND ART

An IF (interstitial free) steel with an ultra low carbon content and a low nitrogen content for the use of automobiles is generally produced in a manner described hereinbelow. Molten iron produced by melting using a blast furnace is subject to refining with oxygen blowing in a converter into a molten steel (hereinafter referred as "produced by melting and refining processing," or simply as "refining-produced" or "refined", for example). Then, the molten steel is subjected to secondary refining performed using an RH (Ruhrstahl-Hausen) degassing system, and then the molten steel is formed into a steel cast slab by using a continuous casting machine. Further, in regard to a steel sheet of, for example, DQ (drawing quality) and EDQC (extra deep drawing quality) for the use of, for example, automobiles and cans, the content of nitrogen (symbol: N) is required to be 35 ppm or less.

Conventionally, a technique for reducing the nitrogen content of a steel sheet such as described above is known. In the technique, a carbon (symbol: C) source, such as a carbon-containing material, is added in a converter into a molten iron, and then an oxygen containing gas is blown into to promote decarburization reaction, thereby to accomplish nitrogen removal of molten steel being obtained. More specifically, the nitrogen. (symbol: [N]) in-the molten steel is likely to be absorbed onto a bubble surface of the CO gas, so that nitrogen removal in the molten steel proceeds faster as the amount of the generated CO gas is greater. In this case, the nitrogen content of molten steel tapped from the converter is about 30 ppm. Further, when the molten steel is processed in an RH degassing system, further nitrogen removal is performed even by reducing pressure in accordance with Expression (1) shown below in addition to the nitrogen removal through the decarburization reaction caused by, for example, oxygen in the molten steel or blowing of the oxygen containing gas.

$$2[N]=N_2 \tag{1}$$

More specifically, nitrogen removal proceeds as nitrogen in the molten steel is gasified at the interface of the gas and the molten steel.

In the processing steps for execution in a sequential arrangement of "blast furnace→converter," large amounts of iron ore (sintered ore) and coke are used as main materials fed into the blast furnace. Hence, not only facilities, namely a sintering plant and a coke plant, are necessary, but also the facility costs of blast furnace and converter themselves are notably high. Further, in recent years, also the necessity of a process replacing that using the blast furnace has increased from the viewpoint of reduction of $CO_2$ emission. Japan is a scrap exporting country. This is due to the fact that processes sufficiently utilizing scrap as an important iron source have not been developed in Japan. Conventionally, scrap has been used in electric furnaces and has been used for the manufacture of reinforced bar and special steel bars/wire rods products, for example. In addition, scrap has not been used by automakers for automotive steel sheets, so that the usage amount of scrap has not been increased so much.

However, when desired low-nitrogen steel can be refining-produced by use of only an electric furnace, not only the facility costs can be reduced, but also the steel can be manufactured with use of only iron scrap, but without use of iron ore as main material. As such, advantages such as use of inexpensive materials and reduction in the amount of $CO_2$ emission can be expected. Of course, in the case of IF steels, such as steel sheets for automobiles and cans, attention is paid on not only for nitrogen, but also on impurity elements (such as Cu and Ni, for example) called "tramp elements." Such tramp elements are less preventable from mixing into molten steel in the use of iron scrap-and that are not desirable for steel properties. However, it is also known that such tramp elements can be prevented into molten steel when an iron source, such as HBI (hard briquet iron), charcoal pig iron, or cold pig iron, is used in combination while paying attention on components of iron scrap intended to be used. As such, it is eagerly desired that the low-nitrogen steel is refining-produced by use of an electric furnace, but without using the processing steps for execution in the sequential arrangement of "blast furnace →converter."

Nevertheless, however, it is now assumed that an attempt is made to refining-produce the IF steel through the series of the processing steps for execution in a sequential arrangement of "electric furnace→RH degassing system→continuous casting machine by use of inexpensive iron scrap as a main iron source. In this case, compared to the converter, not only the electric furnace as a vessel is inferior in the sealing performance (against the atmosphere), but also the usage rate therein of molten iron, which has a high carbon content, is low. Hence, even when an attempt is made to perform nitrogen removal through the decarburization reaction, is performed, the nitrogen content of the molten steel tapped is in the range of about 50 to about 100 ppm at lowest. Further, although an attempt is made to perform nitrogen removal in the molten steel through reducing pressure by use of the RH degassing system (see FIG. 3), nitrogen in the atmosphere is drawn thereinto due to leakage from a snorkel. Hence, even when the-process period of time is increased as desired, nitrogen removal does not proceed so much, and it is difficult to refining-produce a low-nitrogen steel having a nitrogen content of 30 ppm or less.

Then, in order to accomplish the nitrogen content reduction of molten steel in electric-furnace steelmaking, an approach is used in which nitrogen removal is caused in the manner that cold pig iron and molten iron having high carbon contents are increased to thereby activate the decarburization reaction. Further, the molten iron is tapped in a so-called "rimming status" in which also the oxygen amount in the molten steel is increased, thereby to reduce absorption of nitrogen into the molten steel occurring during tapping. Nevertheless, however, the nitrogen content of the molten steel obtainable in the approach is limited to a range of from 30 to 50 ppm. Further, since there occurs also the nitrogen absorption from the atmosphere, it was impossible to stably refining-produce molten steel having a nitrogen content of 40 ppm or less. As such, such reduction of the nitrogen content of molten steel has been given up, but there has been developed a technique of manufacturing steel excellent in formability in the manner that the nitrogen content is limited to a range of from 40 to 90 ppm, and other elements are regulated (see Japanese Patent Publication No. 3177146, for example).

Further, generally, in the case of primarily producing ferric stainless steel having a low-nitrogen content, a so-called "VOD process" is used. More specifically, a VOD (Vacuum Oxygen Decarburization) degassing system shown in FIG. 2 is employed to replace an RH degassing system, and reduction of the nitrogen content is accomplished through processing steps for execution in a sequential arrangement of "electric furnace→VOD degassing system→continuous casting machine." According to the technique, the carbon content of the molten steel to be treated in VOD degassing system is previously increased, and as described above, nitrogen removal is caused through the decarburization reaction and also nitrogen removal under pressure-reducing is applied in combination, thereby to promote nitrogen removal.

Further, in regard to nitrogen removal in molten steel, various researches have hitherto been conducted. As a consequence, it has become clear that nitrogen removal occurs with Expression (2) representing a so-called "slag-metal reaction" between molten steel and slag and Expression (3) representing the slag-gas reaction that causes shifting from in-slag nitrogen ion.

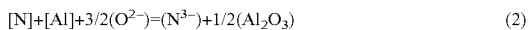  (2)

  (3)

In the above, each of those indicated with not parentheses nor brackets indicates a gas state, [ ] indicates a state where the item is contained in the molten steel, and ( ) indicates a state where the item is contained in the slag.

For example, a technique using an approach for accomplishing reduction of the nitrogen content in the following manner is known (see Japanese Unexamined Patent Application Publication No. 2005-232536 for example). In this approach, a so-called "VOD process" for the refining-production of the ferric stainless steel is applied to the refining-production of ordinary carbon steel. In this case, carbon and aluminum (symbol=Al) are added to a molten steel tapped from an electric furnace, and then the molten steel is transferred into a VOD degassing system for oxygen blowing, thereby to cause heating-up by Al agent. Thus, there is applied a condition causing the decarburization reaction in preference to oxidation of Cr contained in the molten steel, and nitrogen removal is performed in the manner that degassing effects resulting from the decarburization reaction is activated utilizing the heating-up by Al agent. In this technique, nitrogen removal is performed in accordance with Expressions (1) and (2).

Further, techniques using Expressions (2) and (3) include such a type as described herein (see Japanese Unexamined Patent Application Publication No. 8-246024). According to this technique, in a VOD system such as described above, while a molten steel is being deoxidized with Al being added thereto, the surface of the molten steel is covered with slag of 15 kg/steel-ton (amount per one ton of the molten steel) or more containing CaO and $Al_2O_3$ as a principal component. Then, an oxygen containing gas is blown onto the molten steel, and nitrogen in the slag is removed through the reaction between the oxygen and the slag, thereby to refining-produce a low-nitrogen steel having a nitrogen content of 20 ppm or less. More specifically, as shown in Expression (3), $(N^{3-})$ shifted from the molten steel to the slag is then oxidized with the oxygen containing gas to be volatilized and removed. Further, oxygen blowing to the molten steel is blocked by slag, and reduction in the [Al] content of the molten steel is suppressed, thereby to accomplish nitrogen removal in the molten steel in accordance with Expression (2). In addition, a technique developed by improving the technique described in Japanese Unexamined Patent Application Publication No. 8-246024 described above is disclosed (see Japanese Unexamined Patent Application Publication No. 9-165615). According to this improved technique, after the surface of molten steel retained in a refinement vessel is covered with the slag, the oxygen containing gas is blown on the surface of the covering slag to an extent not causing direct contact with the molten steel. In addition, a nitrogen-removal flux in a powder form containing CaO, $Al_2O_3$, and $CaC_2$ is directly blown into the molten steel, thereby to accomplish nitrogen removal. This technique expects the reaction represented as Expression (4) below.

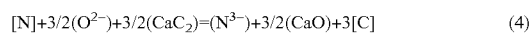  (4)

DISCLOSURE OF THE INVENTION

Problems to be Solved by the Invention

As described above, in the technique disclosed in the Japanese Unexamined Patent Application Publication No. 2005-232536, the nitrogen content of the molten steel is reduced by use of the electric furnace. More specifically, after the carbon and Al have been added to the molten steel tapped from the electric furnace, the molten steel is transferred into the VOD degassing system for oxygen blowing, and heating-up by Al agent is caused to activate the decarburization reaction, thereby to perform nitrogen removal through the degassing effects. However, because the addition of carbon-containing material to the molten steel, which is an additional treatment, is performed, the period of time necessary for the refinement of the steel in the VOD system is increased. As such, there arises a problem in that not only it becomes difficult to matching with "sequential of continuous casting" (continuous casting without ending the molten metal in a tundish) in the following continuous casting process, but also refinement costs are increased due to reduction in productivity. Further, there arises the problem of environmental pollution resulting from $CO_2$ emission to the atmosphere, the $CO_2$ being generated by the decarburization reaction.

According to the technique described in Japanese Unexamined Patent Application Publication No. 8-246024, nitrogen removal is performed through the reaction between the slag and the oxygen containing gas while the molten steel is being deoxidized with Al, thereby to refining-produce the low-nitrogen molten steel having the nitrogen content of 20 ppm or less. However, this technique requires the Al deoxidization in which Al is added to the molten steel in the event of tapping from the VOD system, and the molten steel is thereby killed. Not only the deoxidization, but also a large amount of an expensive Al metal or Al alloy has to be used. As an example, it is described in the publication (Paragraph [0019]) that the steel is preferably maintained at [Al]≧0.3 wt % for at least 10 minutes during nitrogen removal.

In particular, in order to refining-produce the molten steel for the IF steel with the ultra low carbon and low nitrogen contents, the molten steel has to be decarburized with oxygen contained in the molten steel. However, the technique has a drawback that, since the deoxidation reaction is caused by addition of a large amount Al, the oxygen necessary for the decarburization is lost.

Further, according to the technique described in Japanese Unexamined Patent Application Publication No. 9-165615, nitrogen removal is performed by blowing the powder flux for nitrogen removal, which contains CaO, $Al_2O_3$, and $CaC_2$, into the molten steel. This technique has a problem in that the refinement cost is increased since a blowing facility for blowing powder flux for nitrogen removal containing CaO, $Al_2O_3$ and $CaC_2$ into the molten steel is additionally necessary. Further, inclusion of C in the slag inevitably causes an increase of [C], thereby causing the problem increase in, for example, degassing cost and $CO_2$ emission.

In view of the circumstances described above, an object of the present invention is to provide a "removal method of nitrogen in molten steel" that enables the refining-production of low-nitrogen steels at low cost by use of an existing electric furnace and degassing system while accomplishing reduction in the amount of $CO_2$ being emitted into the atmosphere.

Means for Solving the Problems

As a result of extensive researches for achieving the object described above, the inventors discovered that a prominent nitrogen-removal phenomenon considered to be resulting from AlN formation occurs in a specific condition, and have realized the results thereof into this invention.

According to one aspect of the present invention, there is provided (1) a removal method of nitrogen in molten steel including the steps of adding a metallic-Al containing material into a molten steel; charging CaO into the molten steel; and supplying an oxygen containing gas into the molten steel, wherein, by the combination of the above steps, slag containing CaO and $Al_2O_3$ but not containing C is formed, and an Al content of the molten steel is controlled to a range of 0.02 mass % or more and 0.08 mass % or less.

In this case, it is preferable that a C content of the molten steel to undergo a nitrogen removal treatment according to (1) is in a range of 0.01 mass % to 0.05 mass %, and therefore, preferably, without performing addition of carbon containing material. It is also preferable that the method further includes a step of subjecting a surface of the molten steel to a pressure-reduced atmosphere.

Further, it is preferable that the molten steel is refined in an electric furnace by using iron scrap as a main iron source, the molten steel is tapped into a refining vessel separately prepared, and the nitrogen removal treatment according to (1) is performed in the refining vessel. Preferably the refining vessel may be a ladle dedicated to a VOD degassing system. Alternatively, the number of the refining vessels may be at least two selected from any one of;

a ladle dedicated to a VD (Vacuum Degassing) degassing system, a VAD (Vacuum Arc Degassing) degassing system, or a CAS (Composition Adjustment by Sealed Bubbling) degassing system,
a ladle dedicated to a CAS-OB (CAB—Oxygen Blowing) system, and
an RH degassing system.

Of course, such a ladle may be shared by the respective systems.

Further, an addition amount of the metallic-Al containing material is preferably in a range of 3 kg to 20 kg per ton of molten steel. Further, a charging amount of CaO is preferably in a range of 1 kg to 50 kg per ton of molten steel. Further, $CaO/Al_2O_3$ in the slag is preferably adjusted in a range of 0.8 to 1.2 by weight ratio. Furthermore, a supply amount of the oxygen containing gas per ton of molten steel is preferably in a range of 2 $m^3$ to 5 $m^3$ (normal state or Normal Cubic Meter).

According to another aspect of the present invention, there is provided a removal method of nitrogen in molten steel is provided, characterized in that a molten steel is refined in an electric furnace by using iron scrap as a main iron source and is then tapped into and retained in a refining vessel separately prepared; and after CaO is entered onto a bath surface of the molten steel without adding carbon-containing material to, then an Al-containing material is added thereonto, and an oxygen containing gas is supplied to the molten steel. Also in this case, it is preferable that a C content of the molten steel to be tapped into the refining vessel is in a range of 0.01 mass % to 0.05 mass %. Further, it is preferable that an addition amount of the Al-containing material and a charging amount of CaO are, respectively, in a range of 3 kg to 20 kg per ton of molten steel and in a range 1 kg to 50 kg per ton of molten steel; and the addition amount of the metallic-Al containing material and the charging amount of CaO are regulated so that $CaO/Al_2O_3$ in the slag is set to a range of 0.8 to 1.2 by weight ratio. Further, a supply amount of the oxygen containing gas per ton of molten steel is in a range of 2 $m^3$ to 5 $m^3$ (normal state or Normal Cubic Meter). It is even more preferable that the refining vessel is a ladle dedicated to any one of a VOD degassing system and an RH degassing system, and the molten steel after the oxygen containing gas is blown onto or blown into is pressure-reduced and degassed.

Further, in any one of the aspects of the present invention, it is preferable that, for example, the molten steel is tapped in a non-deoxidized state from the electric furnace, or the oxygen containing gas is provided by blowing onto the bath surface of the molten steel or directly blowing into the molten steel. Further, the molten steel after degassed may be desulfurized in an LF (Ladle Furnace) system.

BRIEF DESCRIPTION OF THE DRAWINGS

FIG. 1A is a view of processing steps for execution in a sequential arrangement of "electric furnace→VOD degassing system→continuous casting machine;"

(b) FIG. 1B is a view of a processing steps for execution in a sequential arrangement where an LF system is connected between the VOD degassing system and the continuous casting machine, in the processing steps according to FIG. 1A;

(c) FIG. 1C is a view of a processing steps for execution in a sequential arrangement of "electric furnace→ladle→RH degassing system (or VOD degassing system)→continuous casting machine;" and (d) FIG. 1D is a view of a processing steps for execution in a sequential arrangement where a molten iron melted in a shaft furnace is used as part of an iron source being fed into the electric furnace.

Figure 1A:
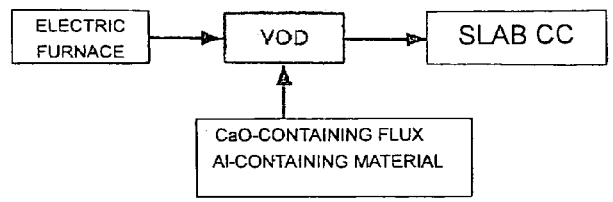
FIGS. 1A to 1D show processing steps utilized for carrying out a removal method of nitrogen in molten steel of the present invention, in which (a)

REFERENCE NUMERALS 1 ladle
2 vacuum tank
3 molten steel
4 oxygen-gas top blowing lance
5 heating means (electrodes)
6 snorkel
7 oxygen gas
8 inert gas
9 outlet of exhaust gas connected for pressure reducing
10 alloy/sub material charging entry port 11 gas pipeline
12 bottom blowing tuyere
13 molten steel movement
14 alloy/sub material
15 alloy/sub material charging facility

BEST MODE FOR CARRYING OUT THE INVENTION

A best mode or embodiment of the present invention and matters including the course to the invention will be described below.

<Course to the Invention>

Figure 2:
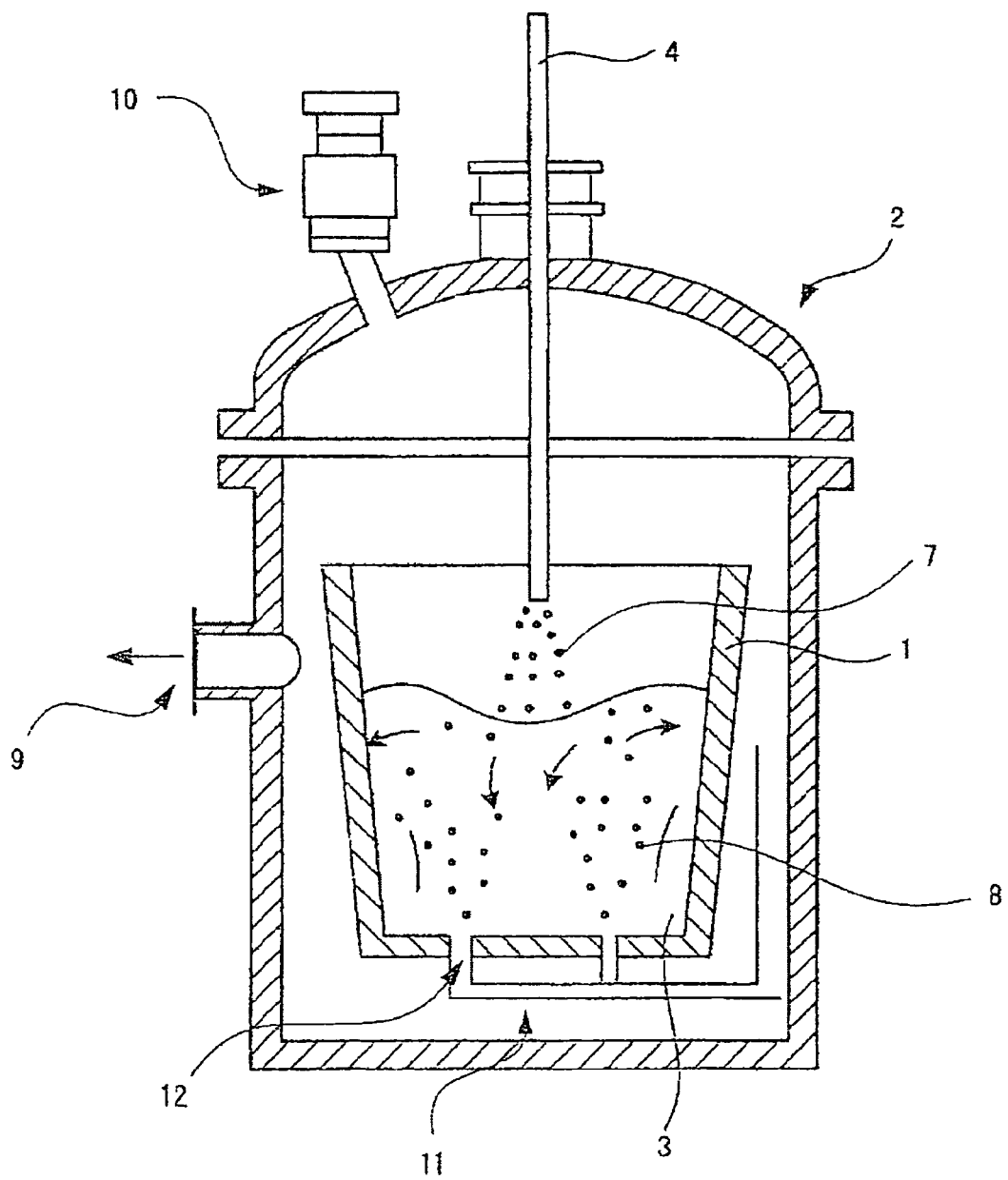
FIG. 2 is a view showing a general VOD degassing system.
Figure 3:
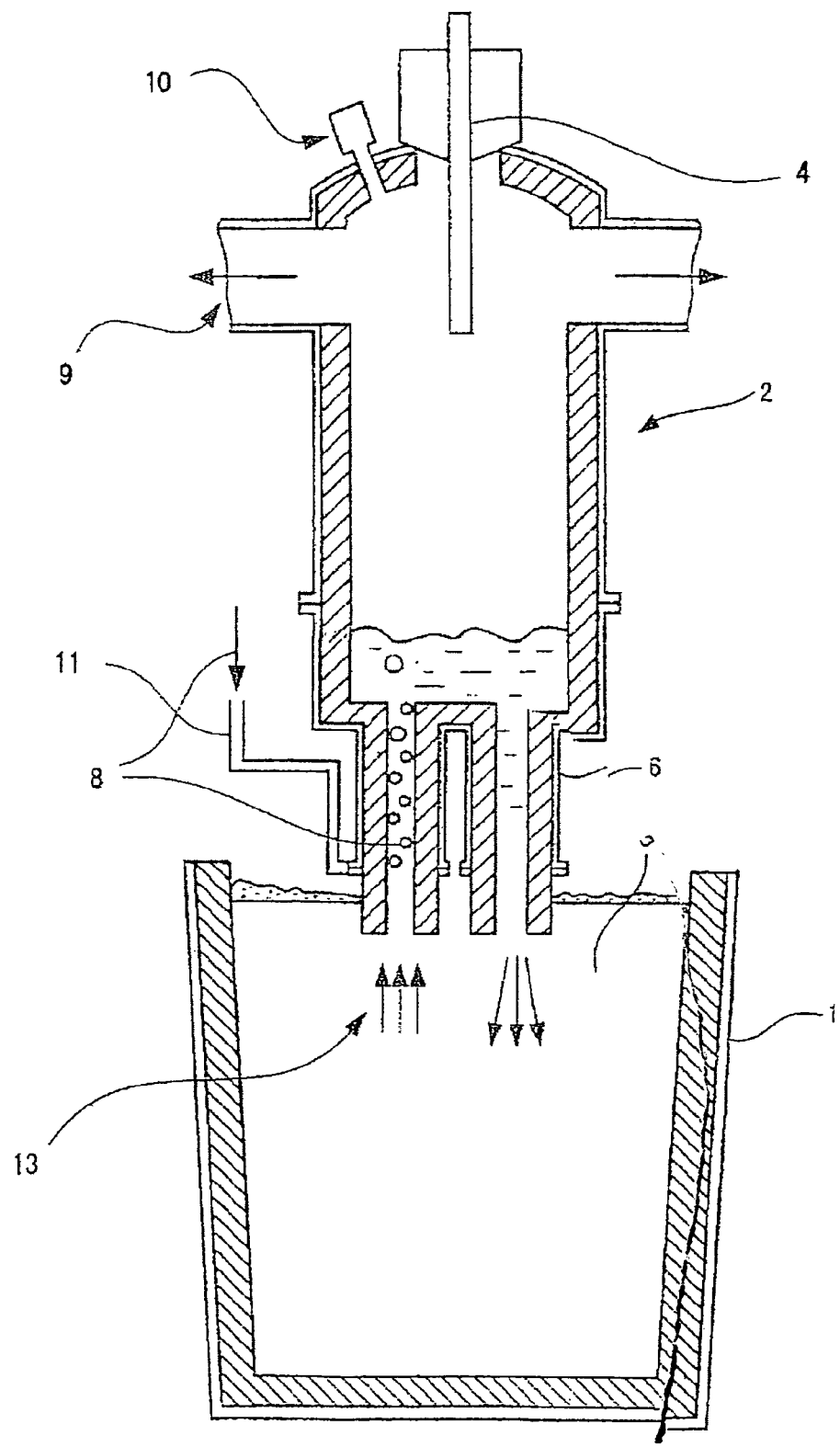
FIG. 3 is a transverse cross sectional view showing a general RH degassing system.

In the process of refining-producing ordinary carbon steel by use of an electric furnace, the steel is generally refined and produced through processing steps for execution in a sequential arrangement of "electric furnace→LF system→(RH degassing system)→continuous casting machine." As described above, since it is difficult to accomplish the reduction of the nitrogen content of the molten steel processed by the electric furnace, the molten steel obtained thereby is ordinarily used for the manufacture of; for example, steel shapes and reinforced steel bars. Hence, in order to further purify the molten steel, various refining vessels are used, such as a VOD degassing system shown in FIG. 2, an RH degassing system shown in FIG. 3, and/or an LF system shown in FIG. 4.

In these apparatuses, molten steel 3 is retained in a ladle 1. In the case of the VOD degassing system (or simply "VOD system," herebelow) (FIG. 2), the molten steel is retained in a vacuum tank 2 on the basis of the ladle 1, and in an ordinary case, it is pressure-reduced through an outlet 9 of exhaust gas connected for pressure reducing. An oxygen gas 7 is supplied to the molten steel through an oxygen-gas blowing lance 4. In addition, an inert gas 8 (argon gas, for example) supplied through a gas pipeline 11 is supplied into the molten steel through a bottom blowing tuyere 12. The arrows in the drawing are each indicative of the movement of air bubbles in the molten steel. Various alloys and sub-source materials are charged from an alloy/sub material charging entry port 10.

The lance and the bottom blowing tuyere are not necessarily present in all cases (which is similar as in other facilities). For example, in the case where the oxygen-gas top blowing lance 4 is not present in the apparatus shown in FIG. 2, the apparatus is referred to as a "VD degassing system" (or a "VD system," hereinbelow). Further, an apparatus formed with electrodes added as a heater unit to the VD system is referred to as a "VAD degassing system" (or a "VAD system," herebelow).

In the case of the RH degassing system (or "RH system," hereinbelow) (FIG. 3), the molten steel in the ladle 1 is circulated by blowing of the inert gas 8 (argon gas, for example) into one of two snorkels through a gas pipeline 11. More specifically, as shown by the arrows of a molten steel movement 13, the molten steel 3 is drawn into the vacuum tank 2 through the snorkel 6, into which the gas 8 has been blown, and is then circulated into from the other snorkel 6. The interior of the vacuum tank 2 is maintained to be substantially vacuum by an exhaust gas emitted from the outlet 9 of exhaust gas connected for pressure reducing. Further, an oxygen gas 7 (not shown) is supplied from an oxygen-gas top blowing lance 4, and materials such as various alloys and sub-source materials are charged from an alloy/sub material charging entry port 10.

In the case of the LF system (FIG. 4), no vacuum tank is present, and various alloys/sub materials 14 are supplied to the molten steel 3 from the alloy/sub material charging entry port 10 through an alloy/sub material charging facility 15.

Further, in the ordinarily case, the inert gas 8 is supplied from, for example, the bottom blowing tuyere 12. In the drawing, numeral 5 denotes a heating unit (electrodes in the ordinary case).

As other apparatuses, there have been proposed a so-called "CAS" system in which a ladle is covered by a cylindrical lid, and molten steel inside the ladle is refined, and a so-called "CAS-OB" system in which an oxygen blowing lance is further provided to the CAS system.

The present invention allows the use of also the so-called "CAS-OB" system, in which a ladle is covered by a cylindrical lid, and an oxygen blowing lance is provided, for adding Al and conducting oxygen-blowing refining.

Figure 4:
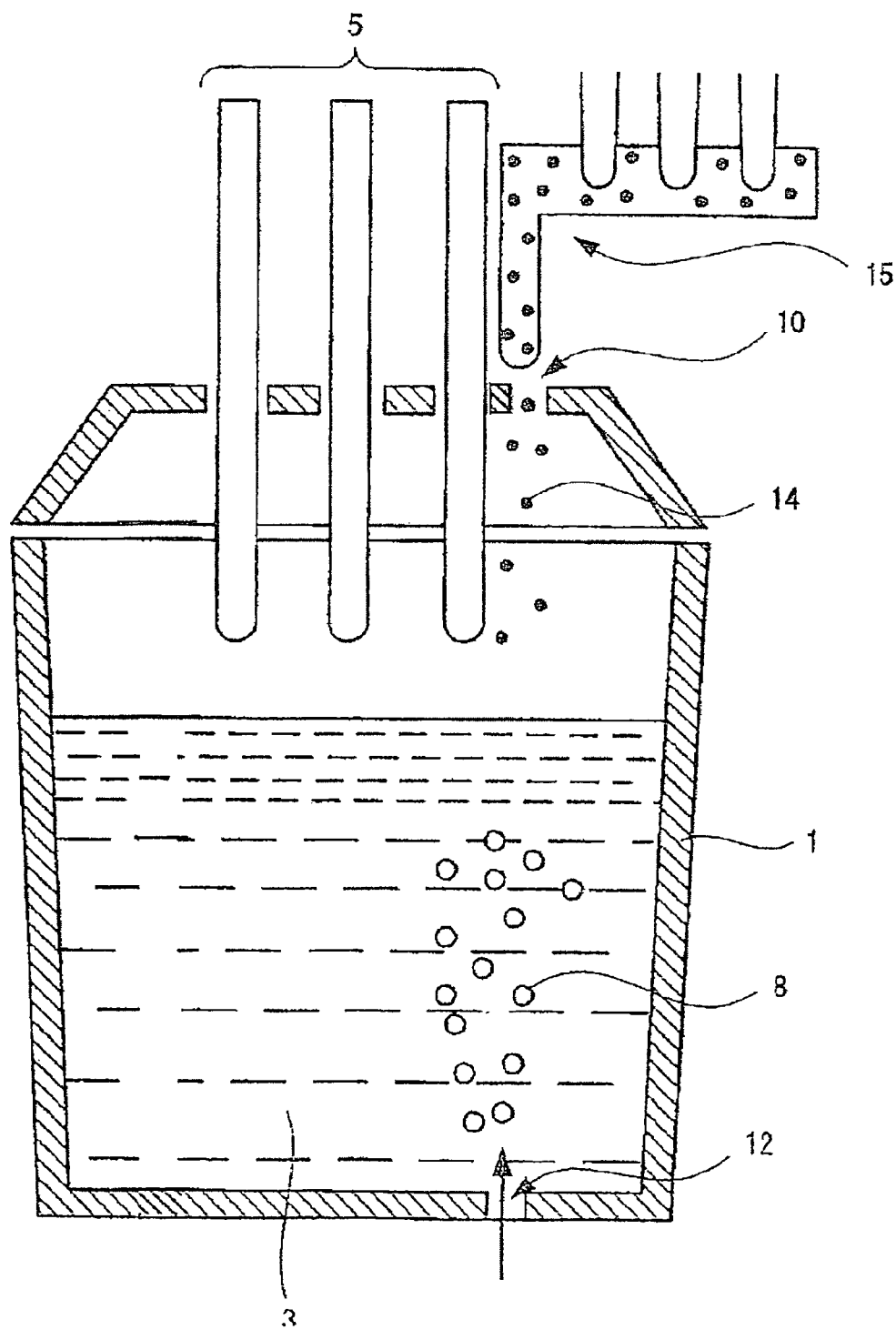
FIG. 4 is a transverse cross sectional view showing a general LF system.

However, in an LF system as shown in FIG. 4, since electricity is used for temperature elevation of the molten steel, an extra electric power cost incurs. Hence, the present inventors employed a technique that adds Al into the molten steel retained in the ladle and that applies oxygen-blowing refining to the molten steel, as a method of causing temperature elevation of the molten steel at low cost. In this case, the inventors considered it important to be careful so that an oxygen amount necessary for performing decarburization to an ultra low carbon state in a subsequent degassing step is not-significantly reduced. As such, experiments were carried out by variably adjusting the residual amount of Al in the molten steel. More specifically, in order to prevent Al from dissolving in the molten steel, an attempt was made to use a method in which, a slag layer is formed by adding CaO to the surface of the in-ladle molten steel received from the electric furnace, thereafter Al-containing material is supplied thereonto.

Unexpectedly, however, under a condition in which an Al content of the molten steel in a range of from 0.02 to 0.08 mass %, which corresponds to a low oxygen potential in molten steel, a significant reduction in the in-steel N (nitrogen) content was observed. This is considered to occur for the reason that when Al is further supplied into the steel under the condition of low oxygen potential in molten steel, AlN is formed in accordance with the reaction "[Al]+[N]→AlN," and further, is then exhausted into surroundings because of some mechanism (mechanism of causing decomposition and forming of nitrogen gas).

Although the mechanism is not as yet made clear, a probability that can be considered is that, for example, AlN is once trapped in the slag, or $Al_2O_3$ formed in the molten steel (or on the surface of the molten steel) exhibits some interaction with the AlN in the molten steel.

Under these circumstances, the inventors this time investigated the influences of the Al content on the nitrogen removal in the following manner. Using iron scrap as a main iron source and an electric furnace, multiple charges of ordinary carbon molten steel were refining-produced and were tapped into the ladle dedicated for the VOD degassing system. The principal components of the molten steel as refining-produced in the electric furnace are as: C=0.03 mass %, Si=0.02 mass % or below, Mn 0.15 mass % or below, and N=70 to 100 ppm. More specifically, oxygen was blown with adding Al-containing material (such as metallic Al) after adding CaO, without adding carbon-containing material to the molten steel. As a consequence, it was found that, while the [C] content of the molten steel after slag discharge from the ladle of the VOD degassing system is maintained unchanged at 0.03 mass %, the [N] content is reduced down to 20 ppm on average. In this case, carbon containing material was not added in order to investigate only nitrogen removal effects by AlN without causing, as much as possible, nitrogen removal accompanied with decarburization. Further, oxygen was blown in order to provide adjustment through oxidation of Al so that Al in the molten steel does not become surplus in content, and to cause to heat up the temperature of the molten steel. Further, CaO was added so that $Al_2O_3$ developed with the oxygen blowing is dissolved to be a slag. The slag thus formed was a $CaO$—$SiO_2$—$Al_2O_3$ based slag.

Further, in the refining of stainless steel in an electric furnace, in association with an increase in [Cr] content, the [N] content increases, causing the [N] content to be 2000 ppm in the event of tapping in a stainless class containing 18 mass % Cr. Similarly to the method described above, in regard to such stainless steels also, the influence on the Al content was investigated. As a consequence, it was learned that the nitrogen content of 2000 ppm is quickly reduced down to 20 ppm or less on average.

Based on the knowledge described above, the technique for the present invention has been accomplished making it into requirements that CaO and Al-containing material (metallic Al, for example) are added to the molten steel, and oxygen is blown.

Conventionally, the nitrogen removal through forming of AlN has not been used. This is thought to be for reasons described herebelow.

Al has hitherto been used to cause temperature elevation of molten steel. In the case of temperature elevation in the RH degassing system in the processing steps for execution in the sequential arrangement of "blast furnace→converter→RH degassing system→continuous casting machine," Al is added into the molten steel and then oxygen is blown thereonto, thereby maintaining the oxygen potential of the molten steel in the zone where the reaction represented as "$[Al]+O_2 \rightarrow (Al_2O_3)$" occurs as a main action. As such, it is considered that the reaction "$[Al]+[N] \rightarrow AlN$" almost does not proceed. Further, even if the reaction represented as "$[Al]+[N] \rightarrow AlN$" has locally occurred, a mechanism of effectively removing the generated AlN from the molten steel does not work in the RH degassing system. Therefore, the nitrogen removal in molten steel is not carried out (N is re-dissolved in the molten steel in accordance with the reaction represented as "$2AlN+(3/2)O_2 \rightarrow Al_2O_3;+2N$."). Further, conventionally, the method as disclosed in Japanese Unexamined Patent Application Publication No. 2005-232536 has been carried out. That is, in the case of refining of the stainless steel in the processing steps for execution in the sequential arrangement of "electric furnace→VOD degassing system→continuous casting machine," while heating up molten steel temperature by Al agent is caused in the VOD degassing system, Al is inevitably used to elevate the temperature of the molten steel. In regard to N, carbon is added to the molten steel, and the nitrogen removal is activated through the subsequent oxygen blowing, whereby N is removed by being entrained into CO bubbles. As such, it is considered that, since a mechanism in the heating-up event by Al agent is not investigated in detail, so that even while the reaction represented as "$[Al]+[N] \rightarrow AlN$" has somewhat proceeded during the temperature elevation, the nitrogen removal through forming of AlN is neither recognized nor adjusted.

According to the technique described in Japanese Unexamined Patent Application Publication No. 8-246024, which is not reliant on the degassing mechanism, theoretical or experimentally-confirmed Al content of the molten steel is significantly high, such that no room remains to conduct research and studies regarding the low Al content as described in the present invention. In the case of the technique described in Japanese Unexamined Patent Application Publication No. 9-165615 in which $CaC_2$ is contained in a slag, as suggested in the publication, the technique is a unique nitrogen removal mechanism reliant on C in the slag, such that the technique is not referential for other means. Also in these techniques, no suggestions are disclosed in regard to conditions-suitable for AlN removal.

<Molten Steel Composition>

Important points of the present invention are to realize conditions appropriate to form AlN and to appropriately remove AlN developed with Al charging. For the purpose, it is necessary that sufficient Al remains to form AlN, under the condition in which the Al added to molten iron forms $Al_2O_3$ by oxygen blowing. Hence, the inventors paid attention to regulation of the [Al] content and [C] content of the molten steel, and the addition amount of CaO, the addition amount of the metallic-Al containing material, and the flowrate of oxygen blowing to the molten steel, and decided to restrict them as described below.

More specifically, in accordance with the investigation results described above, the [Al] content of the molten steel under nitrogen removal (or "nitrogen removal treatment") is restricted to the range of between about 0.02 mass % or more and about 0.08 mass % or less. In the case the [Al] content is less than about 0.02 mass %, the oxygen potential is not reduced to a level that enables the AlN formation reaction to sufficiently proceed. In short, Al necessary for reaction with nitrogen content ([N]) of the molten steel lacks. Further, even when once formed, the AlN quickly is decomposed, thereby causing re-nitridation. When the event that the [Al] content exceeds about 0.08 mass % not only waste in cost occurs, but also oxygen contributing to vacuum decarburization lacks, so that such a treatment is not preferable. Otherwise, when a large amount of Al remains, the concentration should be reduced down to an Al content tolerable for the products, so that there occurs the necessity of performing de-aluminization. In this case, not only a loss in refinement time is increased, but also an amount of inclusions increases, therefore prohibiting the cleanliness of the molten steel. A more preferable lower limit is about 0.03 mass % or more, and a more preferable upper limit is about 0.06 mass % or less.

In the event of tapping the molten steel from the electric furnace into a refining vessel, such as the VOD system, tapping of the molten steel is preferably performed in a non-deoxidized state (so-called "rimmed tapping"). A reason therefor is that the manner of tapping is advantageous in that, in the event of tapping, nitrogen is prevented from being absorbed from the atmosphere to thereby prevent the nitrogen content from increasing and in that a necessary amount of oxygen for vacuum decarburization is secured. In this case, the [Al] content turns out to be less than 0.02 mass % in the stage the molten steel is tapped in the refining vessel. Accordingly, the [Al] content can preferably be regulated to fall within the above-described range by charging the metallic-Al containing material either before or in the event of the start of nitrogen removal treatment.

The [C] content of the molten steel preferably falls within a range of from 0.01 to 0.05 mass %. It is difficult to refine a molten steel having less than 0.01 mass % C in an electric furnaces. In the event of more than 0.05 mass % C, the decarburization reaction becomes active, so that such an event is preferably prevented if the effect of suppression of an occurrence amount of $CO_2$ emission is thought to be important. However, it is not intended to inhibit the use of [C] exceeding 0.05 mass % to be contained for aiding nitrogen removal by degassing. While also the range of the [C] contents described above is the range of values applicable in the event of the start of the nitrogen removal treatment, the content is preferably controlled to fall within the range in the event of tapping of the molten steel from the electric furnace from the viewpoint of operationability. A desired composition in regard to [Al] content in the event of completion of nitrogen removal according to the present invention is similar to the above-described.

In view of the object of the present invention, [N] is preferably 40 ppm or less. More preferably, the N content is 30 ppm or less. Even more preferably, the content is 20 ppm or less. Most preferably, the content is 15 ppm or less.

While no restrictions are imposed on [C], it is preferable that, in view of the needs for the ultra low carbon IF steel as a background of the invention, also decarburization is performed in parallel, and C is controlled to be 50 ppm or less. More preferably, the content is 30 ppm or less. Even more preferably, the content is 15 ppm or less to take carbon pick-up into account. Most preferably, the content is 10 ppm or less.

While the nitrogen-removal mechanism of the present invention does not specifically have influences of other elements, the iron content is set to be 70% or more. In a general composition of the ultra low carbon IF steel, $Si \leq 0.1\%$, $Mn \leq 0.3\%$, and $P \leq 0.03\%$ by mass, and there are added carbide-forming elements, such as Ti and Nb, in content sufficient (at least 0.7 times C in atomic ratio) to fix carbon. Depending upon the case, elements other than the above, such as B, are each added by 0.01 mass % or less. In the case of a high-strength IF steel, strengthening elements, such as Si, Mn, P, Mo, Cr, Ti, and Nb, are each added by 5 mass % or less, and more preferably are each added by 3 mass % or less.

<Charging Materials>

The metallic-Al containing material is added into and CaO is charged to the molten steel composition-controlled as described above, and the nitrogen removal treatment is started.

The metallic-Al containing material can be added by an amount necessary to enable controlling the [Al] content during reaction to fall within the range described above. Although practical addition amounts are influenced by, for example, properties of the facility, the lower limit as a rough indication is preferably set to be 3 kg/steel-ton or more as metallic Al part. Further, the upper limit as a rough indication is preferably set to be 20 kg/steel-ton or less as metallic Al part.

As the metallic-Al containing material, it is possible to use, for example, metallic Al (containing about 95 mass % or more as metallic Al part) generally used as deoxidizing agent for molten steel, or Al ash (in which the content of the metallic Al part is in the range of about 25 mass % to about 75 mass %, and the reminder is mainly $Al_2O_3$) generally used as a slag treatment. Alternatively, an Al alloy, such as an iron-aluminum alloy, may be used. Preferably, as the iron-aluminum alloy, an alloy containing 20 mass % or more Al is used.

The types of the metallic-Al containing material and the adding method therefor are not specifically limited. However, it is preferable that a method of using, for example, granular or solid metallic-Al containing material is used since Al can be stably supplied into the molten steel, as compared to a method of supplying the material in a powder form that is prone to float on the molten steel surface, for example.

The granular or solid metallic-Al containing material may be directly charged thereinto. Alternatively, for example, these metallic-Al containing material may be packed into a metal (such as iron) container (box), and the whole container may be pushed into the molten steel. Thereby, with melting of the container, a sufficient amount of Al is supplied into the steel.

CaO acts to dissolve $Al_2O_3$ occurring with the Al addition and to form slag. Hence, a desirable addition amount of CaO may be set to be 1 kg/steel-ton or more, and more preferably to be 5 kg/steel-ton or more. However, when the addition amount is large, the value of $CaO/Al_2O_3$ in the slag may become out of the preferable range, and further, there are reverse effects on control of the temperature of the molten steel. Hence, addition amount is set to be preferably 50 kg/steel-ton or less, and more preferably 40 kg/steel-ton or less.

The type of CaO is not specifically limited, but ordinarily slag material can be used. For example, ordinarily powdered or granular limestone, lime, burnt lime, and dolomite can be suitably used. Further, while the charging method is not specifically limited, the method of supplying onto the molten steel surface from above is most suitable from the viewpoint of cost and efficiency.

Further, from the viewpoint of suitable dissolution of $Al_2O_3$, CaO and the metallic-Al containing material is preferably added so that an in-slag $CaO/Al_2O_3$ rate between CaO and $Al_2O_3$ each expressed in mass % contained in the slag is 0.8 or more and 1.2 or less. In order to cause the in-slag $CaO/Al_2O_3$ rate to fall within the range, for example, the amount of $Al_2O_3$ to be generated can be calculated from the amount of supply of, for example, oxygen gas and Al, and then the charging amount of CaO can be determined to realize the composition rate.

In addition, while the slag contains CaO and $Al_2O_3$, the slag may be changed to a $CaO-SiO_2-Al_2O_3$ based slag as a result of, for example, oxidation of Si contained in the molten steel.

Further, the slag substantially does not contain C (inclusive of C compounds). More specifically, material containing C as a non-impurity substance is not intentionally added as a slag material. This is because, in the present invention, not only C is not necessary, but also C causes an increase in the [C] content of the molten-steel, thereby resulting in an increase in the amount of $CO_2$ emission. Further, also in view of the purpose of acquiring ultra low carbon steel, it is not preferable to cause C to be contained in the slag.

The present invention is not affected by the order of adding CaO and metallic-Al containing material. From the viewpoint of operational efficiency, both may be simultaneously charged. Alternatively, CaO may be charged first by giving priority Lo slag formation. Further alternatively, at least part of Al may be charged first to implement optimization of oxygen potential. While it is preferable to add Al first especially when tapping the molten steel in a non-deoxidized state, even either the simultaneous or preferential CaO addition does not cause any difficulty for nitrogen removal treatment.

<Atmospheres During the Treatment, and Oxygen Supply>

According to the present invention, oxygen blowing is performed for, for example, regulation of the molten steel [Al] content.

The blowing flowrate of the oxygen containing gas influences the molten steel temperature elevation, the slag formation speed, and the AlN formation speed. According to the research and studies conducted by the inventors, the flowrate are set preferably to be 2 to 5 $m^3$ (normal state)/steel-ton on an oxygen amount conversion basis. At less than 2 $m^3$ (normal state)/steel-ton, the slag formation speed is reduced, the heating-up of molten steel by Al agent is reduced, and further, a reverse influence is imposed on the nitrogen-removal efficiency, so that the flowrate is not preferable. At above 5 $m^3$ (normal state)/steel-ton, splash is likely to occur in the molten steel, so that the flowrate is not preferable from the viewpoint of operational stability and productivity.

For blowing the oxygen containing gas, the gas may be blown onto the surface of the steel bath, or alternatively, the gas may be directly blown into the bath through, for example, the lance. However, blowing onto the surface is preferable from the viewpoint of facility costs.

As the oxygen containing gas, any one of a pure oxygen gas, air, oxygen-enriched air, and gas mixture of these gases and an inert gas (such as an argon gas) can be used. However, an industrial pure oxygen gas is most economical.

<Processing Facilities and Front-End and Back-End Processing Steps>

The refining vessel, preferably, is a ladle dedicated to the VOD degassing system or the RH degassing system, so that the molten steel is pressure-reduced and degassed after said oxygen containing gas has blown thereonto or blown thereinto. In the case where the refining vessel is used as the ladle dedicated to the VOD degassing system or the RH degassing system, various advantages are produced since they are existing facilities. As such, there are advantages in cost since additional facility costs are unnecessary, and additional time and labor are not necessary for the subsequent degassing treatment. In this case, the degassing treatment is performed because not only decarburization can be effected to an extremely low-carbon level through further oxygen blowing, but also nitrogen removal can be slightly performed. Further, the molten steel is finally deoxidized with, for example, Al and Ti. Therefore, the use of the ladle is also advantageous to cause floatation and removal of deoxidation products, such as $Al_2O_3$ and $TiO_2$, developed during the deoxidation. Besides, according to the present invention, the molten steel after degassed may be desulfurized by use of the LF system.

In particular, the VOD degassing system enables oxygen top blowing and pressure reducing, and further enables the slag-molten steel reaction to be easily caused, so that the apparatus is well suited for carrying out the present invention.

For promoting the removal of AlN in the molten steel through nitrogen gasification, it is considered suitable to pressure-reducing from the ambient (i.e., at the molten steel surface) atmosphere. While a pressure-reducing goal level does not have to be specifically determined, it is suitable to determine that the goal level is 50 Torr or more from the viewpoint of the cost, and is 500 Torr or less and preferably 200 Torr or less from the viewpoint of nitrogen-removal efficiency improvement.

Processing types for smoothly carrying out the present invention include those as shown in FIGS. 1A to 1D.

First, as shown in FIG. 1A, the nitrogen removal treatment is performed in the following manner. In an electric furnace (shown in leftmost block), iron scrap is used as a main iron source, and molten iron, cold pig iron, and the like and a dissolving agent are added by necessity, whereby a molten steel is refined and produced in accordance with an ordinary electric furnace steelmaking method. Subsequently, after tapping of the molten steel into the ladle dedicated to the VOD degassing system, nitrogen removal is conducted without performing pressure-reducing in the VOD degassing system (shown in a middle, upper block), by adding CaO-containing flux and Al-containing material (metallic-Al containing material) (shown in a middle, lower block), and thereafter blowing an oxygen-containing gas into the molten steel. Subsequently, the molten steel is tapped from the ladle, and is processed by the continuous casting machine (slab CC shown in the rightmost box) into a cast steel slab. In the processing steps, reducing pressure may be conducted in the VOD degassing system after the nitrogen removal treatment, and further processes such as decarburization and degassing may be performed through oxygen blowing. Thereby, an ultra-low-carbon and low-nitrogen steel, such as IF steel, can be refined.

Figure 1B:
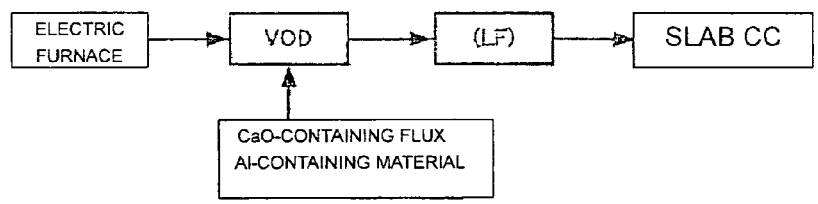

Further, according to the present invention, as shown in FIG. 1B, after the processing steps of nitrogen removal in the sequential arrangement of "electric furnace→ladle" is executed similarly as in FIG. 1A, desulfurization may be performed in the LF system (shown in a middle-right box), and then continuous casting may be performed.

Further, instead of the configuration such as VOD system which has an oxygen top blowing facility, a pressure-reducing facility, and a facility with capability of performing the slag-molten steel reaction as well, following apparatuses may be applied. That is, a combination of more than two apparatuses such as RH, VD, VAD, CAS, CAS-OB, LF systems, which does not include at least any one of the above-mentioned facilities (i.e. an oxygen top blowing facility, etc.) may be applied.

Figure 1C:
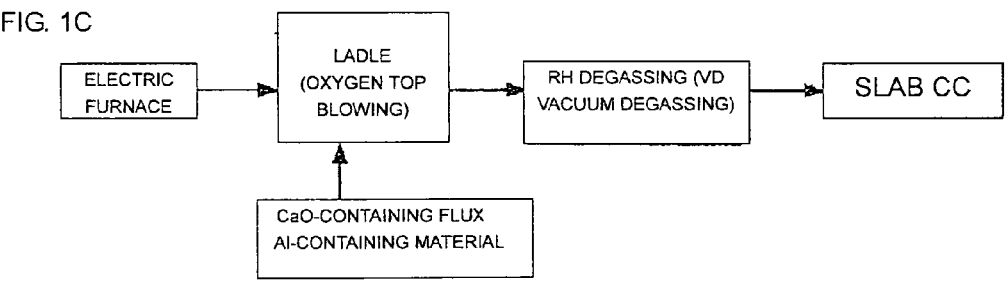

For example, processing steps shown in FIG. 1C may be used. More specifically, in place of the processing steps of nitrogen removal using the VOD system shown in FIG. 1A, an apparatus (such as the CAS-OB system) not including a pressure-reducing function is used, and only oxygen top blowing and slag reaction are performed (shown in a middle, upper-left block). Thereafter, AlN is further reduced by performing reducing pressure, or further process of degassing or component adjustment is conducted, by using, for example, the RH, VD, or VAD system (shown in a middle-right block), and then continuous casting is performed.

Further, the configuration may be such that a relatively large amount of Al is charged into the molten steel by using, for example, the VD, VAD, CAS, or LF system not including the oxygen blowing function, thereby causing trapping AlN in the slag. Thereafter, an apparatus, such as the RH or CAS-OB system, which is capable of performing oxygen blowing, or further capable of performing reducing pressure, is used, thereby further promoting the removal of AlN contained in the molten steel.

In the case that two or more facilities such as described above are used, it is preferable that the respective processes are sequentially performed by using one common ladle.

Figure 1D:
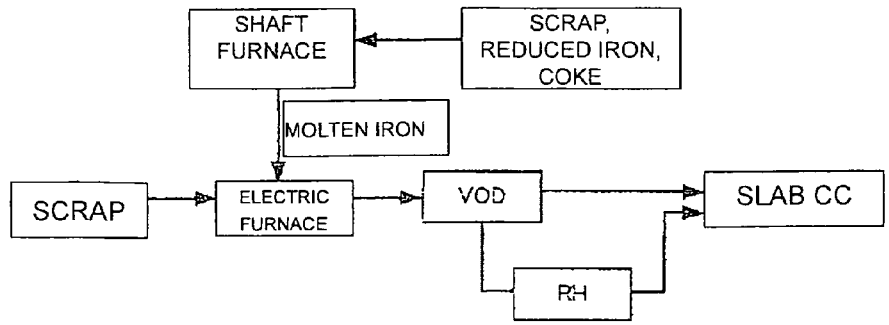

In addition, as shown in FIG. 1D, according to the present invention, as iron sources in the processing steps shown in any one of FIG. 1A or 1C, not only the scrap is dissolved (shown in the leftmost block) in the electric furnace (shown in a middle, left lower block), but also a separately refined molten iron, which is produced by charging scrap and/or direct reduced iron together with coke into a shaft furnace (shown in a middle, right upper block), may be utilized.

EXAMPLES

Example 1

An ultra-low-carbon and low-nitrogen steel was manufactured by using the processing steps shown in FIG. 1A, which has the sequential arrangement of "electric furnace→VOD degassing system→continuous casting machine," and by applying the removal method of nitrogen in molten steel of the present invention. First, in an electric furnace having a production capacity of 100 tons, iron scrap as a main iron source, and cold pig iron as an auxiliary iron source were charged, and a dissolving agent was added, and the oxygen gas was blown through the lance, and decarburization and the like treatments were performed. Thereby, the iron melt was refined, and a molten steel was produced. Then, the molten steel was tapped in a non-deoxidized state into the ladle.

The ladle is set in the VOD degassing system, CaO was immediately added by 10 kg/steel-ton into the molten steel, and then aluminum ash equivalent in amount to an Al amount of 5.5 kg/steel-ton was charged. Subsequently, the oxygen gas was blown onto the surface of the steel bath at a flowrate of 0.44 m³ (normal state)/min/steel-ton through the top blowing lance, and Al was burned. Thereby, heating up the temperature of the molten steel and slag forming were Performed, and as well, the atmosphere in the apparatus was pressure-reduced to 500 Torr. Blowing of the oxygen gas was stopped after an elapse of ten minutes, and the molten steel after deslagged was tapped into a ladle that is used for transferring the molten steel to the continuous casting machine.

Then, the ladle was transferred to the continuous casting machine, and the molten steel was cast into a slab through a tundish. The composition of the molten steel in the tundish under casting was analyzed in respective stages in the course from the refinement of the molten steel in the electric furnace to in-tundish molten steel during casting, and the results are shown in Tables 1 and 2. In summary, in either Example 1 or Example 2 (described below), there was produced a desirable molten steel with the C content of 10 ppm or less and the nitrogen content of 20 ppm or less.

TABLE 1

| | | Temperature (° C.) | Chemical Composition*1 | | | | | | | |
|---|---|---|---|---|---|---|---|---|---|---|
| | | | C (ppm) | Si (%) | Mn (%) | P (%) | S (%) | Al (%) | O (ppm) | N (ppm) |
| Aimed Composition | | — | 5 ppm | <0.01 | 0.08 | <0.010 | <0.006 | 0.060 | <40 ppm | <20 ppm |
| Acceptable Composition | | — | <10 ppm | <0.02 | <0.15 | <0.015 | <0.010 | <0.080 | <60 ppm | <40 ppm |
| Actual Composition | | | | | | | | | | |
| Electric Furnace | Blowing Stopped | | 0.024 | 0.01 | 0.06 | 0.007 | 0.006 | | | |
| | Tapping | | | | | | | | | 50 ppm |
| VOD | Immediately after Tapping | | 0.036 | 0.013 | 0.04 | 0.006 | 0.004 | | 640 ppm | 70 ppm |
| | Entry into VOD*2 | 1630 | | | | | | | 460 ppm | |
| | In-process 1*3 | 1735 | 0.040 | | | | | | 83 ppm | 23 ppm |
| | In-process 2*3 | >1750 | 0.016 | 0.013 | 0.014 | 0.007 | 0.0010 | 0.030 | 110 ppm | 20 ppm |
| | Vacuum Started | 1745 | 11 ppm | | 0.032 | 0.007 | 0.0050 | | 410 ppm | 18 ppm |
| | Vacuum Treatment 1 | 1710 | 14 ppm | 0.010 | 0.027 | 0.007 | 0.0057 | | 280 ppm | 17 ppm |
| | Vacuum Treatment 2 | | 12 ppm | 0.050 | 0.025 | 0.008 | 0.0058 | | 240 ppm | 15 ppm |
| | Vacuum Treatment 3 | 1660 | 9 ppm | 0.060 | 0.023 | 0.008 | 0.0058 | | 320 ppm | 14 ppm |
| | Vacuum Termination | 1645 | 10 ppm | 0.000 | 0.024 | 0.007 | 0.0058 | | 370 ppm | 13 ppm |
| | In the Air Treatment 1 | 1632 | 10 ppm | 0.010 | 0.021 | 0.007 | 0.0059 | | 430 ppm | 16 ppm |
| | In the Air Treatment 2 | 1615 | 9 ppm | 0.020 | 0.065 | 0.007 | 0.0059 | 0.078 | 71 ppm | 14 ppm |
| | In the Air Treatment 3 | | 8 ppm | 0.020 | 0.060 | 0.007 | 0.0059 | 0.055 | 46 ppm | 15 ppm |

*1Unit for values other than those indicated by ppm (=mass ppm): mass %
*2Charging of CaO and metallic-Al containing material
*3Oxygen blowing period

TABLE 2

| | | Temperature (° C.) | Chemical Composition*1 | | | | | | | |
|---|---|---|---|---|---|---|---|---|---|---|
| | | | C (ppm) | Si (%) | Mn (%) | P (%) | S (%) | Al (%) | O (ppm) | N (ppm) |
| Aimed Composition | | — | 5 ppm | <0.01 | 0.08 | <0.010 | <0.006 | 0.060 | <40 ppm | <20 ppm |
| Acceptable Composition | | — | <10 ppm | <0.02 | <0.15 | <0.015 | <0.010 | <0.080 | <60 ppm | <40 ppm |
| Actual Composition | | | | | | | | | | |
| Electric Furnace | Blowing Stopped | 1645 | 0.011 | 0.008 | 0.04 | 0.009 | 0.006 | | | 64 ppm |
| | Tapping | 1650 | 0.011 | 0.008 | 0.04 | 0.009 | 0.006 | | | |
| | Entry into VOD*2 | 1580 | 0.010 | 0.02 | 0.02 | 0.006 | 0.005 | | 840 ppm | 81 ppm |
| | In-process 1*3 | 1650 | 0.058 | 0.042 | 0.03 | 0.008 | 0.002 | 0.024 | 160 ppm | 20 ppm |

TABLE 2-continued

| | Temperature (° C.) | C (ppm) | Si (%) | Mn (%) | P (%) | S (%) | Al (%) | O (ppm) | N (ppm) |
|---|---|---|---|---|---|---|---|---|---|
| In-process 2*[3] | 1645 | 0.013 | 0.017 | 0.02 | 0.008 | 0.004 | | 140 ppm | 18 ppm |
| Vacuum Started | 1643 | 12 ppm | 0.016 | 0.02 | 0.008 | 0.005 | | 200 ppm | 16 ppm |
| Vacuum Treatment 1 | 1635 | 13 ppm | 0.011 | 0.02 | 0.008 | 0.006 | | 280 ppm | 14 ppm |
| Vacuum Treatment 2 | 1625 | 11 ppm | 0.014 | 0.02 | 0.008 | 0.005 | | 270 ppm | 14 ppm |
| Vacuum Termination | 1615 | 9 ppm | 0.014 | 0.02 | 0.009 | 0.0056 | | 400 ppm | 15 ppm |
| In the Air Treatment 1 | 1610 | 9 ppm | 0.013 | 0.06 | 0.008 | 0.006 | 0.060 | 54 ppm | 15 ppm |

*[1]Unit for values other than those indicated by ppm (=mass ppm): mass %
*[2]Charging of CaO and metallic-Al containing material
*[3]Oxygen blowing period Further, slag discharged was analyzed, and it was found that the main components thereof are CaO, $Al_2O_3$, and $SiO_2$, then $CaO/Al_2O_3$ is about 1.0 by weight ratio.

Example 2

The nitrogen removal treatment was performed under substantially the same conditions as those in Example 1. One of changed points is that iron-aluminum solid (diameter: about 30 mm) containing about 33 mass % Al was directly charged into the molten steel at substantially the same time as charging of CaO. Further, CaO (dolomite) was added by the amount of 15 kg/steel-ton, and Al was added by an amount equivalent to metallic Al: 20 kg/steel-ton. Further, the targeted pressure-reducing level was set to 200 Torr.

Similarly as in Example 1, the molten steel composition was analyzed at the respective stages, and it was found that the operation was conducted with an Al content of the molten steel falling within the range of f from 0.030 to 0.060 mass %. Further, it was found that the molten steel was produced to have a C content of 10 ppm or less and N content of 12 ppm or less.

Comparative Example

Using the experimental conditions in Example 2 as basic conditions, a nitrogen removal treatment was conducted as a comparative example by regulating the Al content in operation to 0.01 mass % (through addition of metallic Al: equivalent to 0.5 kg/steel ton).

Under the conditions in the comparative example, which does not satisfy the requirements of the present invention, the nitrogen content after nitrogen removal was as high as about 60 ppm, so that the degree of nitrogen removal was insufficient.

INDUSTRIAL APPLICABILITY

Conventionally, the manufacture of IF steels such as steel sheets for automobiles and cans has only been enabled through the series of processing steps for execution in the sequential arrangement of "blast furnace→converter→RH degassing system→continuous casting machine." However, according to the present invention, the manufacture of the IF steels is enabled to be accomplished at low costs through processing steps for execution in an existing sequential arrangement of "electric furnace→VOD degassing system→continuous casting machine."

Further, since the method of the inventive uses the nitrogen-removal mechanism not reliant on degassing as main processing, the method satisfies environment-friendly issues such as suppression of $CO_2$ gas emission.

The invention claimed is:

1. A removal method of nitrogen in molten steel, comprising the steps of:
   adding a metallic-Al containing material into a molten steel;
   charging CaO into the molten steel; and
   supplying an oxygen containing gas into the molten steel,
   wherein, by the combination of the above steps, slag containing CaO and $Al_2O_3$, but not containing C is formed, and an Al content of the molten steel during a nitrogen removal reaction is controlled to a range of 0.02 mass % or more and 0.08 mass % or less.

2. The removal method of nitrogen in molten steel as described in claim 1, wherein a C content of the molten steel to undergo a nitrogen removal treatment is in a range of 0.01 mass % to 0.05 mass %.

3. The removal method of nitrogen in molten steel as described in claim 2, further comprising a step of subjecting a surface of the molten steel to a pressure-reduced atmosphere.

4. The removal method of nitrogen in molten steel as described in claim 2, wherein the molten steel is refined in an electric furnace by using iron scrap as a main iron source, the molten steel is tapped into a refining vessel separately prepared, and the nitrogen removal treatment is performed in the refining vessel.

5. The removal method of nitrogen in molten steel as described in claim 4, wherein the refining vessel is a ladle dedicated to a VOD degassing system.

6. The removal method of nitrogen in molten steel as described in claim 4, wherein the refining vessel is at least two vessels selected from the group consisting of
   a ladle dedicated to a VD degassing system, a VAD degassing system, or a CAS degassing system,
   a ladle dedicated to a CAS-OB system, and
   an RH degassing system.

7. The removal method of nitrogen in molten steel as described in claim 2, wherein an addition amount of the metallic-Al containing material is in a range of 3 kg to 20 kg per ton of molten steel.

8. The removal method of nitrogen in molten steel as described in claim 2, wherein a charging amount of CaO is in a range of 1 kg to 50 kg per ton of molten steel.

9. The removal method of nitrogen in molten steel as described in claim 2, wherein an addition amount of the metallic-Al containing material and a charging amount of CaO are regulated so that $CaO/Al_2O_3$ in the slag is in a range of 0.8 to 1.2 by weight ratio.

10. The removal method of nitrogen in molten steel as described in claim 2, wherein a supply amount of the oxygen containing gas per ton of molten steel is in a range of 2 $m^3$ to 5 $m^3$ (normal state) in terms of oxygen.

11. The removal method of nitrogen in molten steel as described in claim 3, wherein the molten steel is refined in an electric furnace by using iron scrap as a main iron source, the molten steel is tapped into a refining vessel separately prepared, and the nitrogen removal treatment is performed in the refining vessel.

12. The removal method of nitrogen in molten steel as described in claim 11, wherein the refining vessel is a ladle dedicated to a VOD degassing system.

13. The removal method of nitrogen in molten steel as described in claim 11, wherein the refining vessel is at least two vessels selected from the group consisting of
    a ladle dedicated to a VD degassing system, a VAD degassing system, or a CAS degassing system,
    a ladle dedicated to a CAS-OB system, and
    an RH degassing system.

14. The removal method of nitrogen in molten steel as described in claim 3, wherein an addition amount of the metallic-Al containing material is in a range of 3 kg to 20 kg per ton of molten steel.

15. The removal method of nitrogen in molten steel as described in claim 3, wherein a charging amount of CaO is in a range of 1 kg to 50 kg per ton of molten steel.

16. The removal method of nitrogen in molten steel as described in claim 3, wherein an addition amount of the metallic-Al containing material and a charging amount of CaO are regulated so that $CaO/Al_2O_3$ in the slag is in a range of 0.8 to 1.2 by weight ratio.

17. The removal method of nitrogen in molten steel as described in claim 3, wherein a supply amount of the oxygen containing gas per ton of molten steel is in a range of 2 $m^3$ to 5 $m^3$ (normal state) in terms of oxygen.

18. The removal method of nitrogen in molten steel as described in claim 1, further comprising a step of subjecting a surface of the molten steel to a pressure-reduced atmosphere.

19. The removal method of nitrogen in molten steel as described in claim 18, wherein the molten steel is refined in an electric furnace by using iron scrap as a main iron source, the molten steel is tapped into a refining vessel separately prepared, and the nitrogen removal treatment is performed in the refining vessel.

20. The removal method of nitrogen in molten steel as described in claim 19, wherein the refining vessel is a ladle dedicated to a VOD degassing system.

21. The removal method of nitrogen in molten steel as described in claim 19, wherein the refining vessel is at least two vessels selected from the group consisting of
    a ladle dedicated to a VD degassing system, a VAD degassing system, or a CAS degassing system,
    a ladle dedicated to a CAS-OB system, and
    an RH degassing system.

22. The removal method of nitrogen in molten steel as described in claim 18, wherein an addition amount of the metallic-Al containing material is in a range of 3 kg to 20 kg per ton of molten steel.

23. The removal method of nitrogen in molten steel as described in claim 18, wherein a charging amount of CaO is in a range of 1 kg to 50 kg per ton of molten steel.

24. The removal method of nitrogen in molten steel as described in claim 18, wherein an addition amount of the metallic-Al containing material and a charging amount of CaO are regulated so that $CaO/Al_2O_3$ in the slag is in a range of 0.8 to 1.2 by weight ratio.

25. The removal method of nitrogen in molten steel as described in claim 18, wherein a supply amount of the oxygen containing gas per ton of molten steel is in a range of 2 $m^3$ to 5 $m^3$ (normal state) in terms of oxygen.

26. The removal method of nitrogen in molten steel as described in claim 1, wherein the molten steel is refined in an electric furnace by using iron scrap as a main iron source, the molten steel is tapped into a refining vessel separately prepared, and the nitrogen removal treatment is performed in the refining vessel.

27. The removal method of nitrogen in molten steel as described in claim 26, wherein the refining vessel is a ladle dedicated to a VOD degassing system.

28. The removal method of nitrogen in molten steel as described in claim 26, wherein the refining vessel is at least two vessels selected from the group consisting of
    a ladle dedicated to a VD degassing system, a VAD degassing system, or a CAS degassing system,
    a ladle dedicated to a CAS-OB system, and
    an RH degassing system.

29. The removal method of nitrogen in molten steel as described in claim 1, wherein an addition amount of the metallic-Al containing material is in a range of 3 kg to 20 kg per ton of molten steel.

30. The removal method of nitrogen in molten steel as described in claim 1, wherein a charging amount of CaO is in a range of 1 kg to 50 kg per ton of molten steel.

31. The removal method of nitrogen in molten steel as described in claim 1, wherein an addition amount of the metallic-Al containing material and a charging amount of CaO are regulated so that $CaO/Al_2O_3$ in the slag is in a range of 0.8 to 1.2 by weight ratio.

32. The removal method of nitrogen in molten steel as described in claim 1, wherein a supply amount of the oxygen containing gas per ton of molten steel is in a range of 2 $m^3$ to 5 $m^3$ (normal state) in terms of oxygen.

33. A process comprising removal of nitrogen in molten steel and degassing conducted after the removal of nitrogen, wherein the removal of nitrogen is characterized in that a molten steel is refined in an electric furnace by using iron scrap as a main iron source and is then tapped into and retained in a refining vessel separately prepared; and thereafter CaO is charged onto a bath surface of the molten steel without adding carbon-containing material, then an Al-containing material is added thereto, and an oxygen containing gas is supplied to the molten steel during the removal of nitrogen.

34. The removal method of nitrogen in molten steel as described in claim 33, characterized in that a C content of the molten steel to be tapped into the refining vessel is in a range of 0.01 mass % to 0.05 mass %.

35. The removal method of nitrogen in molten steel as described in claim 34, wherein
    an addition amount of the Al-containing material and a charging amount of CaO are, respectively, in a range of 3 kg to 20 kg per ton of molten steel and in a range 1 kg to 50 kg per ton of molten steel; and the addition amount of the metallic-Al containing material and the charging amount of CaO are regulated so that $CaO/Al_2O_3$ in the slag is set to a range of 0.8 to 1.2 by weight ratio.

36. The removal method of nitrogen in molten steel as described in claim 34, wherein a supply amount of the oxygen containing gas per ton of molten steel is in a range of between $2 \text{ m}^3$ and $5 \text{ m}^3$ (normal state) in terms of oxygen.

37. The removal method of nitrogen in molten steel as described in claim 34, wherein the refining vessel is a ladle dedicated to any one of a VOD degassing system and an RH degassing system, and the molten steel after the oxygen containing gas is supplied is pressure-reduced and degassed.

38. The removal method of nitrogen in molten steel as described in claim 33, wherein an addition amount of the Al-containing material and a charging amount of CaO are, respectively, in a range of 3 kg to 20 kg per ton of molten steel and in a range 1 kg to 50 kg per ton of molten steel; and the addition amount of the metallic-Al containing material and the charging amount of CaO are regulated so that $CaO/Al_2O_3$ in the slag is set to a range of 0.8 to 1.2 by weight ratio.

39. The removal method of nitrogen in molten steel as described in claim 33, wherein a supply amount of the oxygen containing gas per ton of molten steel is in a range of between $2 \text{ m}^3$ and $5 \text{ m}^3$ (normal state) in terms of oxygen.

40. The removal method of nitrogen in molten steel as described in claim 33, wherein the refining vessel is a ladle dedicated to any one of a VOD degassing system and an RH degassing system, and the molten steel after the oxygen containing gas is supplied is pressure-reduced and degassed.

* * * * *